United States Patent [19]

Nakauchi

[11] Patent Number: 4,989,950
[45] Date of Patent: Feb. 5, 1991

[54] LENS POSITION CORRECTION DEVICE

[75] Inventor: Hiroaki Nakauchi, Osaka, Japan

[73] Assignee: Minolta Camera Kabushiki Kaisha, Osaka, Japan

[21] Appl. No.: 282,447

[22] Filed: Dec. 9, 1988

[30] Foreign Application Priority Data

Dec. 12, 1987 [JP] Japan .................. 62-189274[U]

[51] Int. Cl.$^5$ ............................................. G02B 7/04
[52] U.S. Cl. .................................. 350/251; 350/252; 350/257
[58] Field of Search ................ 350/252, 255, 251, 257

[56] References Cited

U.S. PATENT DOCUMENTS 4,834,514  5/1989  Atsuta et al. .................... 350/255

FOREIGN PATENT DOCUMENTS 2814816  10/1978  Fed. Rep. of Germany ...... 350/255
56-139111 10/1981  Japan .
 609763  4/1985  Japan .
61-179520 11/1986  Japan .
62-36617  1/1987  Japan .................................. 350/255

Primary Examiner—Bruce Y. Arnold
Assistant Examiner—Martin Lerner
Attorney, Agent, or Firm—Price, Gess & Ubell

[57] ABSTRACT

A lens barrel having a movable barrel with a first cam channel, a fixed barrel with a second cam channel, a lens holding frame and a cam follower fitted in each of the first and second cam channels and fixed onto the lens holding member. The cam follower is made of elastic material and has a contact portion formed on the peripheral surface thereof so as to be in elastically pressing contact with one of the movable barrel, the fixed barrel and the lens holding member.

10 Claims, 4 Drawing Sheets

U.S. Patent  Feb. 5, 1991  Sheet 1 of 4  4,989,950
FIG.1
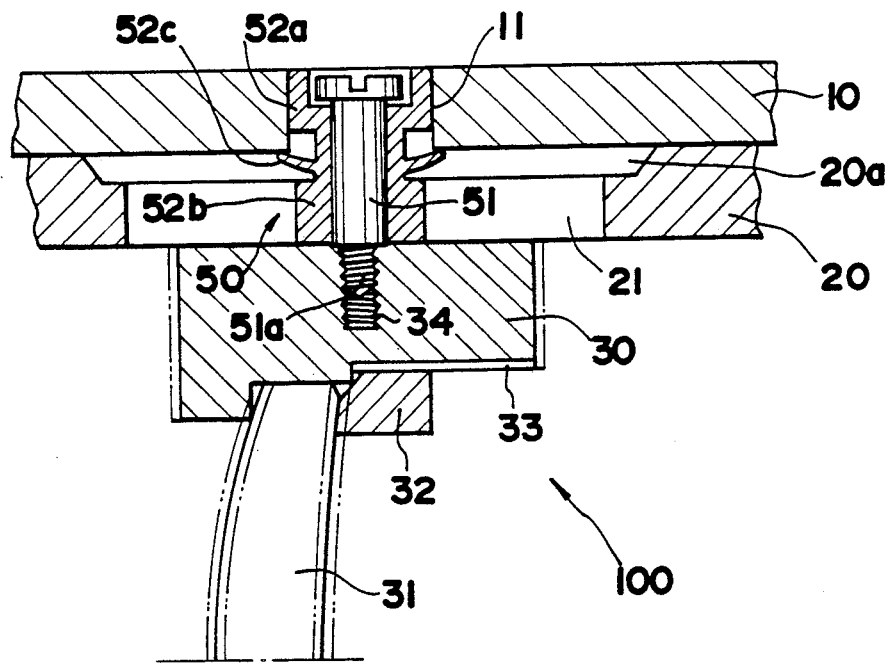
FIG.2
FIG.3
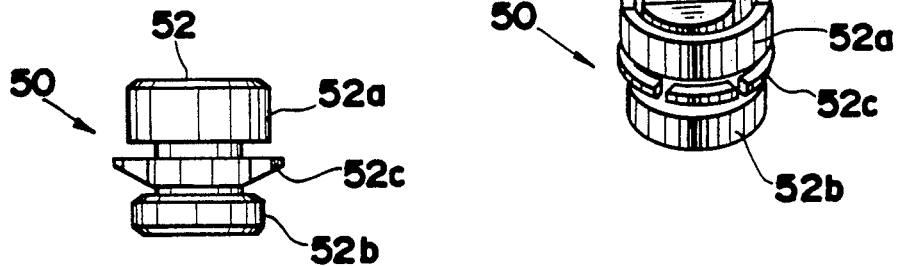
FIG.4
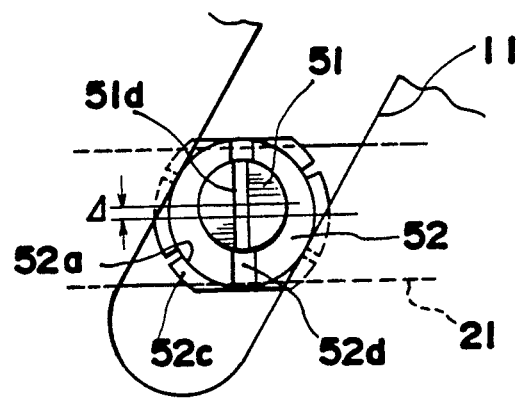

LENS POSITION CORRECTION DEVICE

BACKGROUND OF THE INVENTION

1. Field of the Invention

The present invention relates to a lens position correction device for a lens barrel, and more particularly to a lens position correction device for a lens barrel having a movable and fixed lens barrels and a lens holding frame

2. Description of the Related Arts

A lens barrel of this type will be explained with reference to FIG. 13 by using a zoom lens as an example In general, a zoom lens 100 comprises a movable barrel 10, fixed barrel 20 and lens holding frame 30, all of which overlap A zooming cam channel 11 formed at the movable barrel 10 and a rectilinear channel 21 formed at the fixed barrel 20 cross each other and engage with a cam follower pin 40 fixed to the lens holding frame 30.

Accordingly, when the movable barrel 10 is rotated, the cam follower pin 40 moves along the zooming cam channel 11 while the rotation of the cam follower pin 40 is prevented by the rectilinear channel 21, whereby the lens holding frame 30 moves to thereby obtain a desired zooming.

However, there occurs inevitably a processing error of the movable barrel 10, fixed barrel 20, lens holding frame 30 or the like, a processing error of the zooming cam channel 11 and rectilinear channel 21 and a cumulative error in assembling these members Therefore, it is necessary to finally correct the position of the lens holding frame 30 at a predetermined position for preventing the shift of an image point at the zooming and the deterioration of an image quality.

To achieve the above, the cam follower pin 40 is consisted of an eccentric pin which is rotated to adjust the relative position of the zooming cam channel 11, rectilinear channel 21 and cam follower pin 40, whereupon the eccentric pin is fastened by an anchor screw.

However, the eccentric pin is displaced when fastened by the anchor screw, resulting in that the accurate positional correction cannot be obtained.

Japanese Laid-Open Utility Model Application No 61-179520 discloses a lens position correction device for a lens barrel in order to eliminate this problem.

More specifically, this device comprises an eccentric pin formed with a splined shaft and a lens holding frame formed with a splined hole which is engaged with the splined shaft, to thereby prevent the eccentric pin from displacing when fastened by an anchor screw after the positional correction.

Further, there has been proposed a technique wherein a polygon shaft and a hole engaged with the polygon shaft is provided instead of the combination of the splined shaft and the splined hole to prevent the eccentric pin from displacing when fastened by an anchor screw after the positional correction.

This correction of the position of the lens is necessary not only in the zooming but also in the focusing and the like.

These conventional lens position correction device for a lens barrel mentioned above has an advantage that the eccentric pin is not displaced when fastened after the correction of the position of the lens. However, this device has a disadvantage in that the driving amount during the correction of the position of the lens is only stepwisely obtained, so that a fine adjustment cannot be achieved.

SUMMARY OF THE INVENTION

The main object of the present invention is to provide a lens position correction device for a lens which is capable of obtaining a fine and continuous correction of the lens position.

Another object of the present invention is to provide a lens position correction device for a lens barrel in which an eccentric pin is not displaced when fastened after the correction of the position of the lens.

These and other objects of the present invention can be accomplished by providing a lens position correction device for use in a lens barrel which comprises movable and fixed lens barrels, each of which is formed with a cam channel, a lens holding member, and a cam follower pin including an eccentric collar fitted in each cam channel and an anchor screw fitted in a hole of said eccentric collar to fasten said eccentric collar to the lens holding frame, said lens position correction device being provided with a contact portion formed on the peripheral surface of said eccentric collar so as to be in elastically pressing contact with one of said movable and fixed lens barrels and lens holding frame.

These and other objects or features of the present invention will become apparent from the following description of the preferred embodiments thereof taken in conjunction with the accompanying drawings.

BRIEF DESCRIPTION OF THE DRAWINGS

In the following description, like parts are designated by like reference numbers throughout the several drawings.

FIG. 1 is a sectional view showing a lens position correction device for a lens barrel;

FIG. 2 is a front view of a cam follower pin shown in FIG. 1;

FIG. 3 is a perspective view of the cam follower pin shown in FIG. 1;

FIG. 4 is a diagrammatic view showing the relation of a zooming cam channel, rectilinear channel and cam follower pin;

DETAILED DESCRIPTION OF THE PREFERRED EMBODIMENTS

Figure 5:
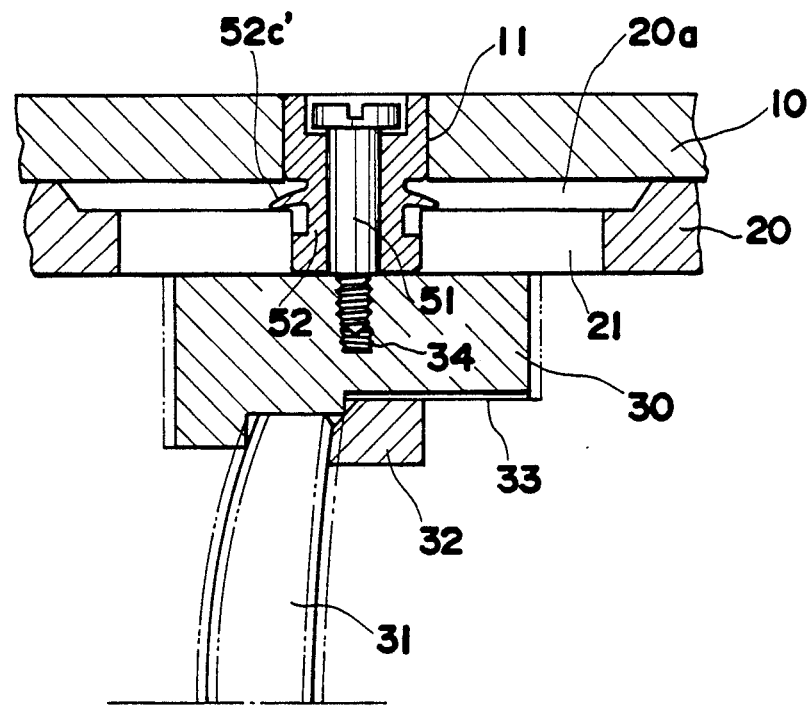
FIG. 5 is a sectional view showing a modified example of the lens position correction device for a lens barrel shown in FIGS. 1 to 4.

The embodiments of the present invention are described hereinafter with reference to FIGS. 1 through 12.

The first embodiment is described hereinafter with reference to FIGS. 1 through 4. The present embodiment is a lens position correction device of the present invention for application to a zoom lens. As shown in FIG. 1, lens 31 which forms the zoom optical system in zoom lens 100 is fixedly held to lens holding frame 30 by clamping ring 32 which is screwed into threaded portion 33 formed on the inner surface of said lens holding frame 30.

A fixed barrel 20 provided with a rectilinear channel 21 is slidably fitted in the direction of the optical axis into the outer surface of the aforesaid lens holding frame 30, and a movable barrel 10 provided with a zooming cam channel 11 is slidably fitted in the optical axis direction into the outer surface of the aforesaid fixed barrel 20.

A notched cutout designated recessed portion 20a is formed in the region which includes the rectilinear channel 21 disposed opposite the zooming cam channel 11.

Lens holding frame 30 has a tapped portion 34 formed perpendicular to the optical axis, said tapped portion 34 being provided an anchor screw 51 of cam follower pin portion 50. Cam follower pin portion 50 comprises said anchor screw 51 and eccentric collar 52.

Eccentric collar 52 is formed as a single unit of polyacetal or similar elastic resin having excellent wear resistance so as to minimize friction, the outer surface of said eccentric collar 52 being comprised of three members, first linking portion 52a, second linking portion 52b and contact portion 52c, as shown in the details of FIGS. 2 and 3. First linking portion 52a is linked to zooming cam channel 11 of the movable barrel 10, and second linking portion 52b is linked to rectilinear channel 21 of fixed barrel 20.

Contact portion 52c is formed so as to have a greater major diameter than either the first linking portion 52a or second linking portion 52b, with a collar-like configuration having a plurality of divisions on the protruding peripheral edge. Further, the aforesaid eccentric collar 52 has a channel 52d provided on the top surface thereof to regulate the rotation of said eccentric collar 52.

Accordingly, lens 31 in lens holding frame 30 is inserted into fixed barrel 20 so as to be anchored thereto and positioned relative to tapped portion 34 and rectilinear portion channel 21, while the movable barrel 10 is fitted to the outer surface of fixed barrel 20, such that when positioned relative to rectilinear channel 21 and zooming cam channel 11, said zooming cam channel 11, rectilinear channel 21 and tapped portion 34 overlap to produce a space. When the eccentric collar 52 is pushed in the aforesaid space) the leading edge of contact portion 52c travels in zooming channel 11 of the movable barrel 10 and bends in the manner indicated by the broken line in FIG. 4. The region in the vicinity of the rim of zooming cam channel 11 of the movable barrel 10 is elastically pressed on the upper surface of contact portion 52c when the leading edge of said contact portion 52c is finally positioned within the recessed portion 20a of fixed barrel 20 by screwing the threaded portion 51a of anchor screw 51 into the tapped portion 34 of lens holding frame 30.

Thereafter, in order to adjust the relative positions of lens holding frame 30, fixed barrel 20 and movable barrel 10, a tool is fitted to slot 52d for applying adjustment power to eccentric collar 52, said eccentric collar 52 is rotated to allow correction of the position of said fixed barrel 20 and movable barrel 10 relative to said lens holding frame 30 by a specific degree of eccentricity $\Delta$ only, as shown in FIG. 4. When a specific degree of correction is obtained, the rotation of eccentric collar 52 stops, a tool such as a reverse driver is fitted to the slot 51b provided on anchor screw 51, and eccentric collar 52 is fixedly fastened to lens holding frame 30 by rotating said anchor screw 51, thereby screwing the threaded portion 51a of said anchor screw 51 into the tapped portion 34.

In the aforesaid situation, a force causing follow-up rotation of eccentric collar 52 is induced by the rotation of anchor screw 51, but said force is absorbed by the contact portion 52c which makes pressure contact with interior wall of movable barrel 10 such that follow-up rotation by the eccentric collar 52 is not induced.

When the eccentric collar 52 is completely secured in position by the rotation of anchor screw 51, it may be completely fixed in place by the application of an adhesive between the top of anchor screw 51 and the top surface of eccentric collar 52 so as to prevent loosening of said anchor screw by vibration and the like.

Although, in the aforesaid embodiment, movement during the securing operation is prevented by the pressure applied by the contact portion 52c to the interior surface of the movable barrel 10, said movement during the securing operation may also be prevented by pressure applied in the vicinity of the rectilinear channel of fixed barrel 20 by the use of a contact portion 52c' which protrudes toward said fixed barrel 20, as shown in FIG. 5.

Figure 6:
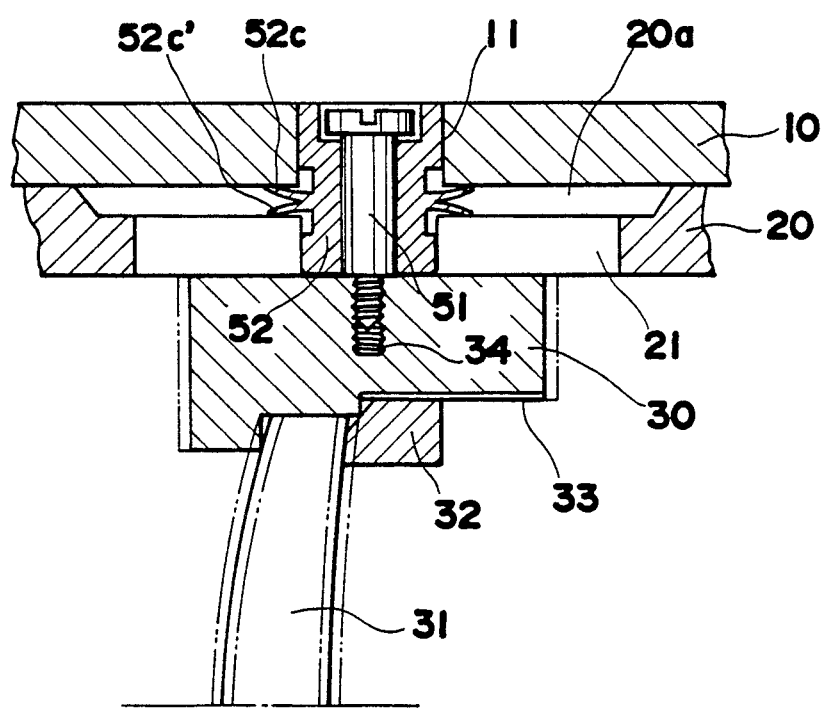
FIG. 6 is a sectional view showing another modified example.

Further, when a contact portion 52c which protrudes upward toward eccentric collar 52 and a contact portion 52c' which protrudes downward toward fixed barrel 20 are both provided, as shown in FIG. 6, movement during the securing operation may be prevented by both the pressure applied by the contact portion 52c on the movable barrel 10 side, and the pressure applied by contact portion 52c' on the fixed barrel 20 side.

Figure 7:
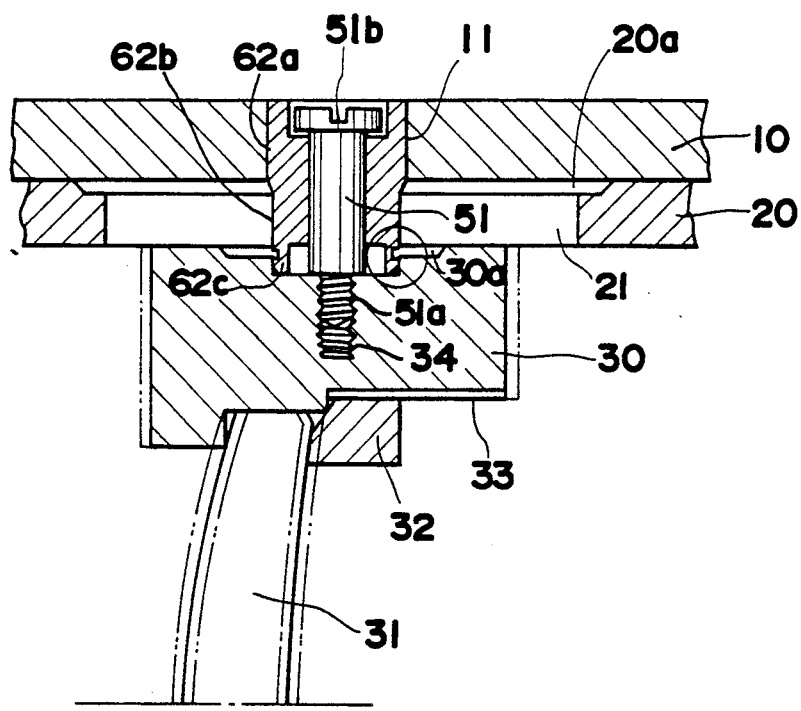
FIG. 7 is a sectional view showing a lens position correction device for a lens barrel according to another embodiment of the present invention.
Figure 8:
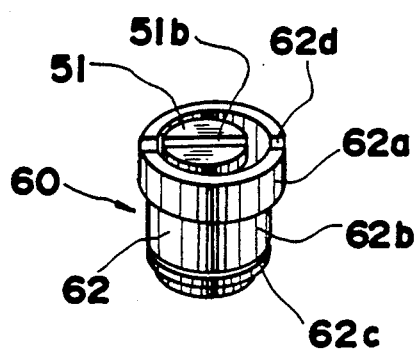
FIG. 8 is a perspective view of a cam follower pin shown in FIG. 7.
Figure 9:
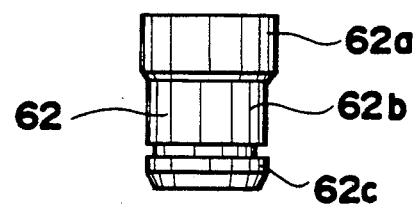
FIG. 9 is a front view of the cam follower pin shown in FIG. 7.

Furthermore, the cam follower pin portion 60 may be constructed as shown in FIGS. 7 to 9. That is, the lens holding frame 30 is provided with a tapped portion 34 formed perpendicularly to the optical axis, said tapped portion 34 having an anchor screw 51 of cam follower pin portion 60 screwed therein. Eccentric collar 62 is formed as a single unit from polyacetal or like elastic resin having excellent wear resistance and producing little friction, and which comprises three members, as shown in detail in FIGS. 8 and 9, first linking portion 62a, second linking portion 62b and contact portion 62c. First linking portion 62a is linked to zooming cam channel 11 of movable barrel 10, and second linking portion 62b is linked to rectilinear channel 21 of fixed barrel 20.

Contact portion 62c is formed so as to have a smaller major diameter than either first linking portion 62a or second linking portion 62b. The peripheral portion of eccentric collar 62 has provided thereon a channel 62d which regulates the rotation of said eccentric collar 62.

The top of lens holding frame 30 has a counterbore portion 30a formed thereon so as to have contact portion 62c fit into said counterbore portion 30a.

Figure 11:
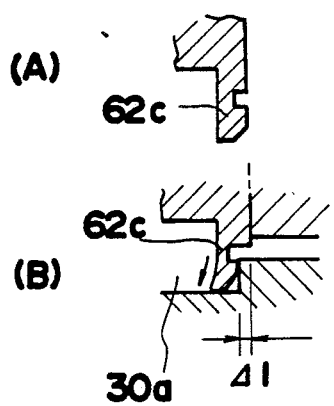
FIG. 11 is a fragmentary sectional view showing the relation of a contact portion and counterbore portion.

Details of the aforesaid fitted state are shown in FIG. 11 wherein the external configuration of contact portion 62c is formed such that it is larger than the minor diameter of counterbore portion 30a of lens holding frame 30 by a factor of Δ1 only.

Accordingly, lens 31 in lens holding frame 30 is inserted into fixed barrel 20 and anchored thereto using for clamping ring 32 so as to be positioned relative to tapped portion 34 and rectilinear channel 21, while movable barrel 10 is fitted to the outer surface of fixed barrel 20 such that when positioned relative to rectilinear channel 21 and zooming cam channel 11, said zooming cam channel 11, rectilinear channel 21 and tapped portion 34 overlap to produce a space. When the cam follower pin portion 60 is pushed in the aforesaid space, the leading edge of contact portion 62c travels in counterbore portion 30a of lens holding frame 30 and bends in the manner indicated by the broken line in FIG. 11. The counterbore portion 30a is elastically pressed by the leading edge of contact portion 62c when the leading edge of said contact portion 62c is finally positioned within the counterbore portion 30a of lens holding frame 30 by screwing the threaded portion 51a of anchor screw 51 into the tapped portion 34 of lens holding frame 30.

Figure 10:
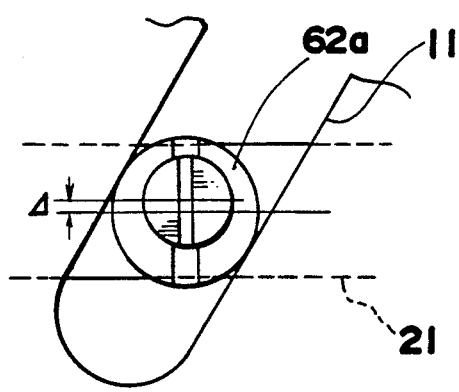
FIG. 10 is a diagrammatic view showing the relation of a zooming cam channel, rectilinear channel and cam follower pin.

Thereafter, in order to adjust the relative positions of lens holding frame 30, fixed barrel 20 and movable barrel 10, eccentric collar 62 is rotated to allow correction of the position of said fixed barrel 20 and movable barrel 10 relative to said lens holding frame 30 by a specific degree of eccentricity Δ only, as shown in FIG. 10. When a specific degree of correction is obtained, the rotation of eccentric collar 62 stops, the aforesaid anchor screw 51 is rotated, and eccentric collar 62 is fixedly fastened to lens holding frame 30.

In the aforesaid situation, a force causing follow-up rotation of eccentric collar 62 is induced by the rotation of anchor screw 51, but said force is absorbed by the contact portion 62c which makes pressure contact with interior wall of counterbore portion 30a of lens holding frame 30 such that follow-up rotation by the eccentric collar 62 is not induced.

When the adjustment is completed, the eccentric collar 62 and anchor screw 51 are completely fixed in place by the application of an adhesive as described in the First Embodiment.

Figure 12:
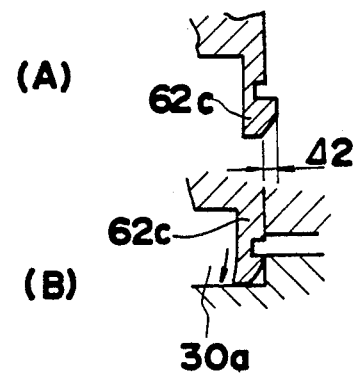
FIG. 12 is a fragmentary sectional view showing the modified relation of a contact portion and counterbore portion.
Figure 13:
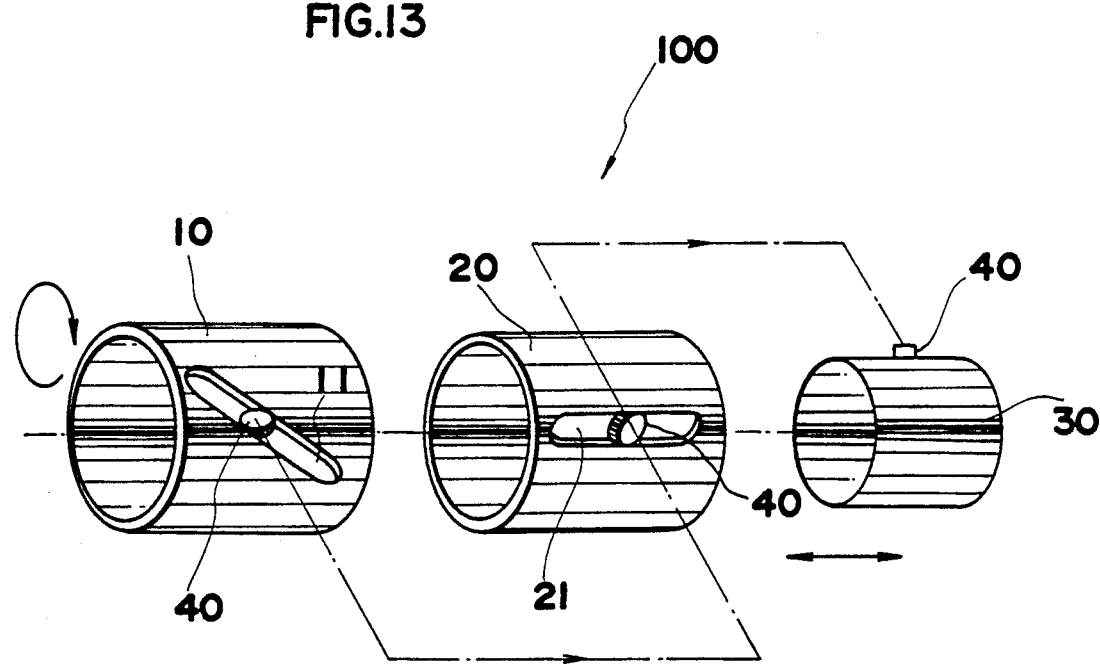
FIG. 13 is a perspective view schematically showing one example of a lens barrel.

In the aforesaid embodiment, a counterbore portion 30a is provided at the top of lens holding frame 30, said counterbore 30a having the contact portion 62c fitted therein. Details of the aforesaid fitted state are shown in FIG. 11 wherein the minor diameter of counterbore 30a of lens holding frame 30 is provided with a stepped configuration and the external configuration of contact portion 62c is larger than said counterbore portion 30a by a factor of Δ1 only, however, the stepped configuration of a minor diameter of counterbore 30a of lens holding frame 30 may be eliminated and the external configuration of contact portion 62c may be made larger than said counterbore portion 30a by a factor of Δ2 only as shown in FIG. 12.

As clearly detailed in the aforesaid description, the lens barrel lens position correction device of the present invention provides for a highly efficient correction because follow-up rotation is not induced during the securing operation and the set position is not altered once the lens position correction has been accomplished.

The members for preventing the previously described follow-up rotation is simple and inexpensive by virtue of being a single unit contact portion acting on the eccentric collar which eliminates the need for external attachments.

Continuous position correction can be accomplished because the member for accomplishing said lens position correction is an eccentric collar which allows for extremely fine adjustment.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A lens position correction device for use in a lens barrel having a movable lens barrel with a first cam channel, a fixed lens barrel with a second cam channel, a lens holding member and a cam follower pin, said lens position correction device is characterized in that said cam follower pin is constituted from an eccentric collar to be fitted in each of the first and second cam channels and an anchor member for tightly fixing the eccentric collar onto the lens holding member, the eccentric collar being made of elastic material and having a contact portion formed on a peripheral surface thereof so as to be in elastically pressing contact with one of the movable barrel, the fixed barrel and the lens holding member.

2. A lens position correction device as claimed in claim 1, wherein the contact portion is formed so as to have a protruding peripheral edge.

3. A lens position correction device as claimed in claim 2, wherein the contact portion is provided with a collar-like configuration having a plurality of divisions on the protruding peripheral edge.

4. A lens position correction device as claimed in claim 2, wherein the protruding peripheral edge is formed to be slightly bent so as to be elastically in contact with either the movable barrel or the fixed barrel.

5. A lens position correction device as claimed in claim 1, wherein the contact portion is formed at a bottom of the eccentric collar so as to tightly fit into a counterbore portion formed on the lens holding frame.

6. A lens position correction device having an improved cam follower assembly for precision alignment with a cam channel in a lens barrel assembly supporting a movable lens barrel comprising;
   a plastic housing member with an outer bearing surface for fixing to the cam channel and a bore extending through the housing member, an axis of the bore is nonconcentric with an axis of the bearing surface, the housing member further including a protruding resilient portion, intermediate of the bearing surface, for providing a biasing force in a direction parallel to the axis of the bearing surface;
   a securement member operatively extending through the housing bore for retaining a predetermined position of the housing member to a cam channel, and
   means on said housing member for enabling rotative adjustment of the outer bearing surface for precision alignment of that bearing surface with the cam channel.

7. The lens position correction device lens position correction device of claim 6 further including means on the securement member for enabling relative movement to the first housing member.

8. A lens position correction device in a lens barrel assembly including a first barrel with a first cam channel, a second barrel with a second cam channel and a lens holding frame comprising:

a cam follower member including an elastic collar to be fitted in the first and second cam channels and an anchor member for fixing said elastic collar to said lens holding frame thereby, an axis of said anchor member is eccentric with that of said elastic collar, wherein said elastic collar has a contact portion protruding out of a peripheral surface thereof for absorbing rotational power of the elastic member accompanied with that of the anchor member by elastically pressing one of the first barrel, the second barrel and the lens holding frame.

9. The lens position correction device as claimed in claim 8 further comprising means on said elastic collar for adjusting the position relationship among the movable barrel, the fixing barrel and the lens holding frame.

10. A lens position correction device for use in a lens barrel having a movable lens barrel with a first cam channel, a fixed lens barrel with a second cam channel, a lens holding member and a cam follower pin, and lens position correction device comprising:

said cam follower pin being constituted from an eccentric collar to be fitted in each of the first and second cam channels and an anchor member for tightly fixing the eccentric collar onto the lens holding member, the eccentric collar being made of elastic material and having a contact portion formed to provide a protruding slightly bent peripheral edge on a peripheral surface thereof so as to be in an elastically pressing contact with one of the movable lens barrel and the fixed lens barrel.

* * * * *